UNITED STATES PATENT OFFICE.

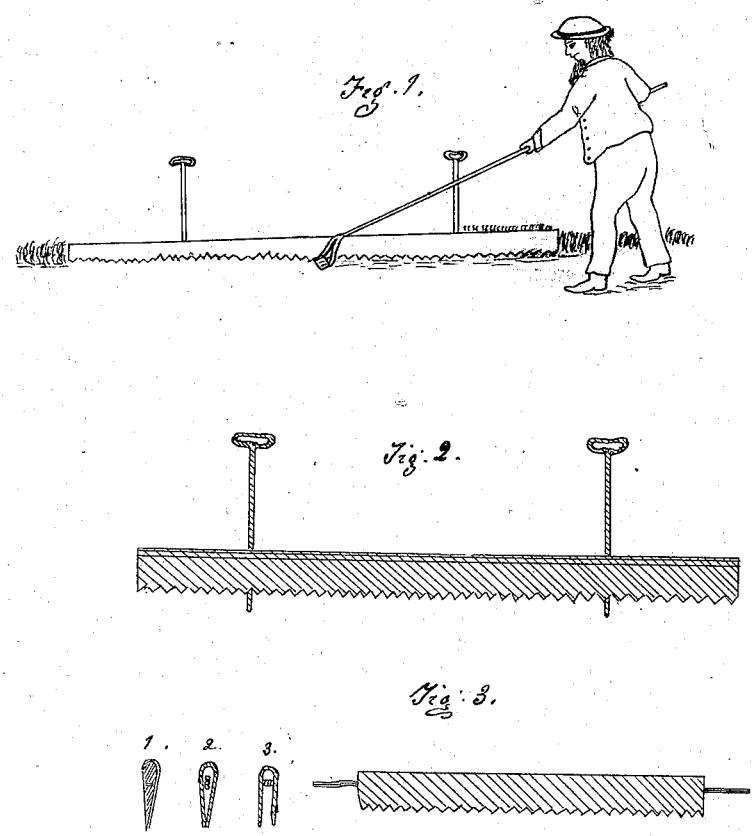

ALEXANDER KIRKPATRICK, OF NEWARK, NEW JERSEY.

IMPROVEMENT IN IMPLEMENT FOR SHIELDING PLANTS FROM A HOE.

Specification forming part of Letters Patent No. 79,133, dated June 23, 1868.

*To all whom it may concern:*

Be it known that I, ALEXANDER KIRKPATRICK, of the city of Newark, in the county of Essex and State of New Jersey, have invented an Implement for Shielding Garden-Plants from a Hoe; and I hereby declare the following to be a full and exact description of the same, reference being had herein to the drawings that accompany this specification as part of the same.

In gardening for market a variety of vegetables are, for convenience of cultivation, sown or planted in drills or rows. In hoeing the rows great care (which consumes time) has to be taken to keep from injuring the plants by hoeing so near as to tear up the roots of such as are in crusty ground, by a moving of the crust by the hoe, and there is always danger of covering the young sprouts with the clods or dirt thrown off the end of the blade of the hoe; there is, besides, a necessity for removal of superfluous or straggling plants, which, "if done, 't were well to be done quickly," without disturbance of the remainder.

As an effectual provision for these needs, I construct a shield of sheet metal, or of combined wood and metal, in length from four to ten feet, in breadth three to five inches, with the lower edge serrated for crusty and plain for sandy ground. This is shown in Figure 1. It will be seen that, for convenience of setting, two handles are attached to the blade, the lower ends of the bars projecting below the lower edge of the shield when forced into the earth, steadying and supporting the shield, Fig. 2. I make both sides of the shield straight from the back to the lower edge, so that the eye of the operator can quickly see whereabout he is placing the shield. The top edge is strengthened by bending it round a rod, or onto the edge of the wood when they are backed with wood, as shown on the end section 1, Fig. 3.

The shield can be made double by bending the sheet metal over, so that a man can work on each side of the row at one and the same time; and if a flat bar be placed between the doubling, the edges of the shield coming together when the broad sides of the flat bar are perpendicular, the shield can be used as a single shield. (See end section 2, Fig. 3.) But when the flat sides are turned horizontal, as in end section 3, Fig. 3, the edges are spread apart, and the plants to be left in the row will be between them when the shield is set over them, and the hoe can pass freely on both sides, without the care and time required when hoed without a shield.

What I claim, and desire to secure by Letters Patent of the United States, is—

The shield, single or double, for protecting plants from injury by the hoe, constructed in the manner and for the purposes specified.

ALEX. KIRKPATRICK.

Attest:
WM. M. GOODING,
D. FIMISTER.